United States Patent Office.

JOSÉ MARIOSA, OF SAN PAULO, BRAZIL, ASSIGNOR OF ONE-HALF TO JOSÉ P. TEBYRICA, OF SAME PLACE.

PROCESS OF PRESERVING MEAT.

SPECIFICATION forming part of Letters Patent No. 474,581, dated May 10, 1892.

Application filed October 5, 1891. Serial No. 407,766. (No specimens.) Patented in Argentine Republic October 18, 1889, No. 803, and in Brazil September 23, 1890, No. 946.

*To all whom it may concern:*

Be it known that I, JOSÉ MARIOSA, a subject of the King of Italy, residing in the city of San Paulo, in the Republic of Brazil, have invented an Improved Process for the Preservation of Meat, (for which I have received Letters Patent in Brazil, dated September 23, 1890, No. 946, and in the Argentine Republic, dated October 18, 1889, No. 803,) of which the following is a specification.

The object of my invention is to preserve meat without smoking, curing, salting, or pickling it, but in such manner that it shall retain all its freshness and nutritive properties, even after a long time has elapsed.

According to my invention I treat fresh meat—such as "butcher's" meat, fish, game, and the like—with a compound of bicarbonate of soda, saccharine matter, and water, and form a coating or envelope on the piece of meat thus treated, which excludes the air and is proof against the entrance of all other agents which vivify germs of fermentation or tend to hasten putrification.

I take of bicarbonate of soda about forty parts and of saccharine matter—such as sugar—about sixty parts and mix them in enough water to form a thick paste or sirup. The piece of meat to be treated is either dipped in the paste or has the paste applied to its surface and rubbed in by a brush or like implement, according to its size. The paste adheres to the surface of the meat and penetrates only the outer stratum. The piece thus coated is preferably hung in the air in a shady place for a short time—say an hour—and then it is placed in an air-current, either natural or artificial, preferably an artificial current induced by a blast-engine or similar machine. When being exposed to the artificial draft, the meat should also be hung in the shade. The length of time to which the meat is subject to the air-blast varies from three hours and upward, according to the size of the piece; but it should be treated a sufficient length of time to thoroughly desiccate the surface.

The mixture of sugar and bicarbonate of soda, as above stated, does not tend to penetrate far into the meat. It simply acts upon the outer surface of the meat, and as the air-currents quickly dry the coating the penetration or absorption of the compound is arrested.

Meat thus treated may be kept for months and transported long distances without deteriorating. By soaking the meat in a bath of cold water or lukewarm water three hours or more, according to the size of the piece, the coating may be dissolved and the meat fitted for use, and it will be found to have retained its freshness, taste, and nutritive properties.

I claim as my invention—

1. The herein-described process of preserving meat, which consists in applying to the surface of a piece of meat a mixture of saccharine matter, water, and bicarbonate of soda in about the proportions stated, and then subjecting the piece of meat thus coated to a drying atmosphere or air-current to form a coating to exclude air and other agents tending to produce fermentation or putrification.

2. The herein-described process of preserving meat, which consists in applying to a piece of meat a mixture consisting of about forty parts of bicarbonate of soda and about sixty parts of sugar and sufficient water to form a pasty mass, causing the mixture to penetrate the outer stratum only of the meat, and then subjecting the piece of meat thus coated to air-currents to thoroughly dry the coating and the surface of the meat in immediate contact therewith.

JOSÉ MARIOSA.

Witnesses:
 JOSÉ P. TEBYRICA,
 VICENTE ABRAMO.